D. F. McCLURE.
DIRIGIBLE HEADLIGHT FOR AUTOMOBILES.
APPLICATION FILED OCT. 22, 1919.
1,367,882.
Patented Feb. 8, 1921.
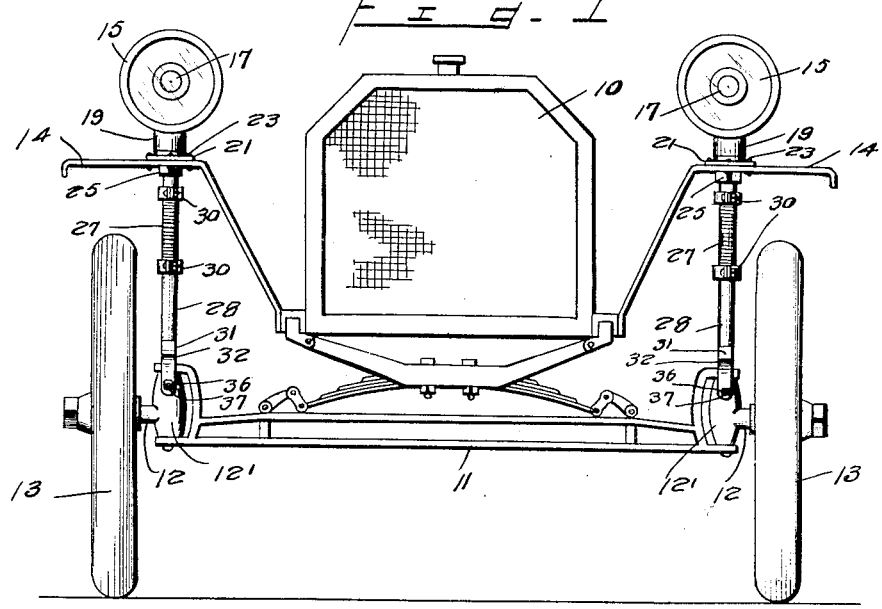
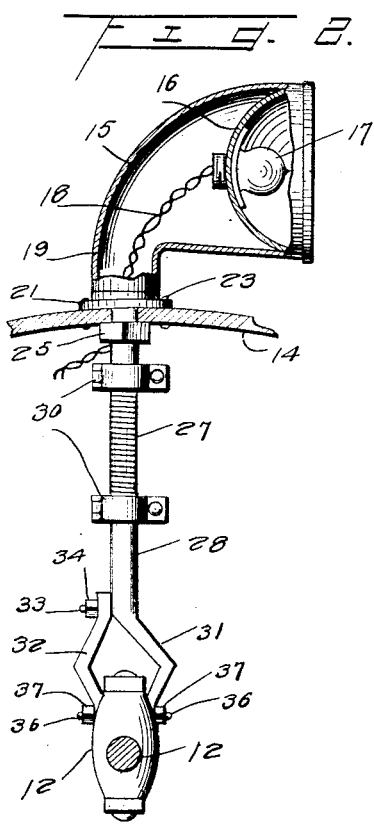
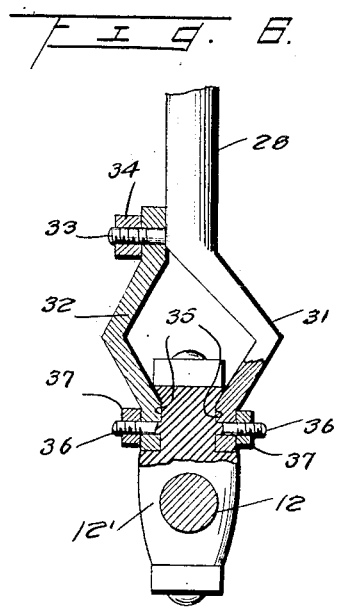
Inventor
D. F. McClure

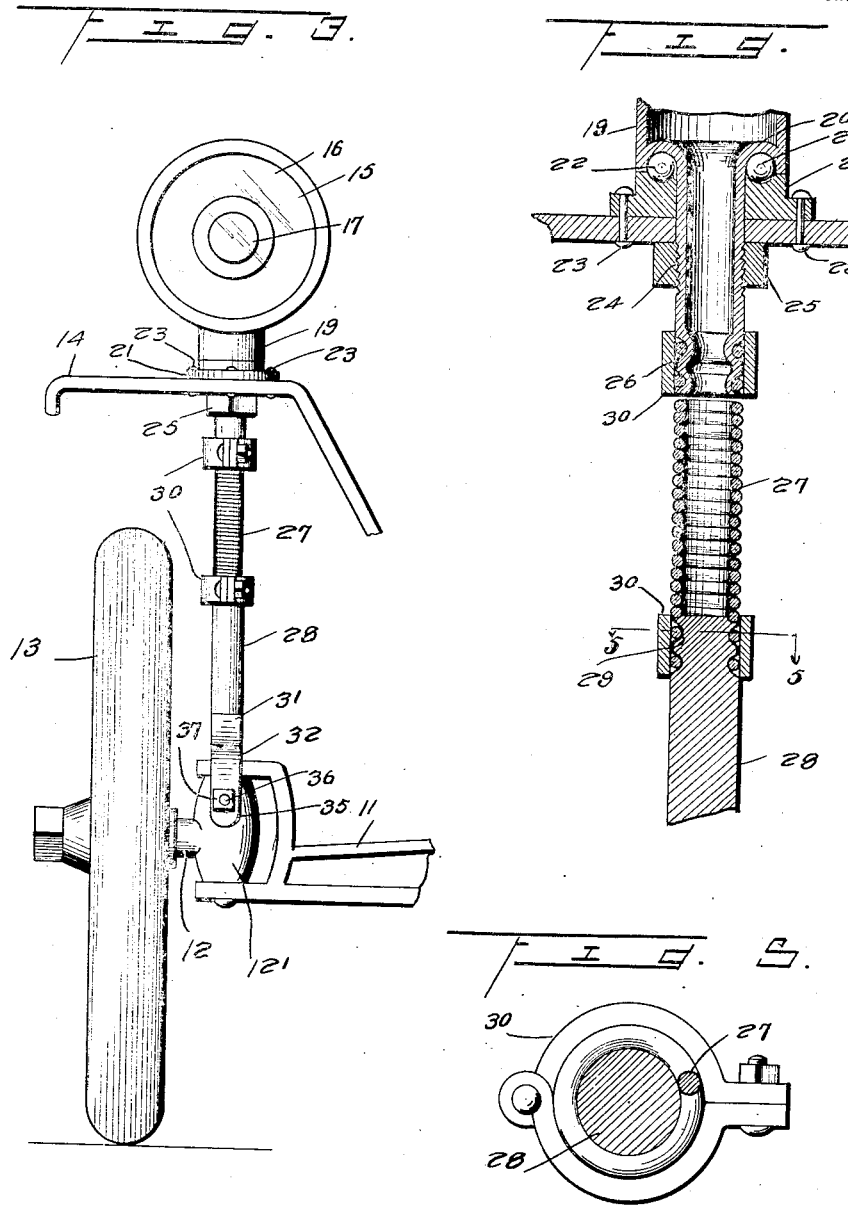

UNITED STATES PATENT OFFICE.

DAVID F. McCLURE, OF OSCEOLA, INDIANA.

DIRIGIBLE HEADLIGHT FOR AUTOMOBILES.

1,367,882.  Specification of Letters Patent.  Patented Feb. 8, 1921.

Application filed October 22, 1919. Serial No. 332,367.

*To all whom it may concern:*

Be it known that I, DAVID F. McCLURE, a citizen of the United States, residing at Osceola, in the county of St. Joseph and State of Indiana, have invented certain new and useful Improvements in Dirigible Headlights for Automobiles; and I do hereby declare the following to be a full, clear, and exact description of the invention, such as will enable others skilled in the art to which it appertains to make and use the same.

My invention relates to improvements in dirigible lights for motor vehicles and more particularly to the operating means therefor.

An important object of this invention is to provide novel means for turning the headlights of a vehicle when the vehicle makes a turn whereby the light may be directed in the direction of travel of the vehicle at all times.

A further object is to provide novel means for cushioning the rotating element of the dirigible headlights whereby rattling and excessive wear is prevented.

A further object of the invention is to provide a dirigible headlight which is simple, automatic in operation, and cheap to install on vehicles of standard types.

Other objects and advantages of the invention will be apparent during the course of the following description.

In the accompanying drawings forming a part of this application and in which like numerals are employed to designate like parts throughout the same, Figure 1 is a front elevation of a vehicle having my improved dirigible headlight applied thereto, Fig. 2 is a side elevation of the headlight and mounting, parts being broken away to illustrate interior construction of the light, Fig. 3 is an enlarged fragmentary front elevation of the vehicle, showing the dirigible headlight applied, Fig. 4 is a fragmentary vertical section through my improved dirigible headlight operating means, Fig. 5 is an enlarged detail section taken through the device along the line 5—5 of Fig. 4, and Fig. 6 is a detail view of the lower portion of the operating means.

In the drawings wherein for the purpose of illustration is shown the preferred embodiment of my invention, the numeral 10 generally designates a motor vehicle provided with the usual front axle 11. Spindles 12 are carried by the ends of the front axle and rotatably support wheels 13. The usual fenders 14 are arranged over the wheels 13 and are adapted for supporting headlights 15. The headlights 15 include a conical shell having a reflector 16 mounted therein and supporting an electric bulb or lamp 17. Suitable feed wires 18 are connected to the lamp 17 and extend rearwardly of the reflector through the conical shell 15. A lens is arranged forwardly of the lamp 17 and is secured to the conical shell 15. The rear portion of the conical shell 15 is supported by a depending tubular section 19 extending through an opening in the fender. The intermediate portion of the tubular section 19 and the adjacent portion of the fender are provided with upper and lower raceways 20 and 21 receiving ball bearings 22. The raceway 21 is secured to the fender by suitable rivets 23. Screw threads 24 are provided on the tubular section 19 below the fender 14 and have engagement with locking nuts 25 which engage the underside of the fender and serve to take up any undue play in the lamp. The lower portion of the tubular section 19 is provided with grooves 26 forming a seat for receiving the upper portion of a vertically arranged spring 27. A turning shaft 28 is positioned beneath the spring and has its upper portion provided with grooves 29 forming a seat for the lower portion of the spring. Clamps 30 hold the ends of the springs in place. A fork arm 31 is provided at the lower end of the shaft 28 and a second fork arm 32 is secured to the shaft by the pin 33 and nut 34. These arms extend upon opposite sides of the kunckle 12' and fit into the rests 35 whereby they are secured by pins 36 and nuts 37.

In the use of my invention, the shell 15 is rotated in the direction of travel of the vehicle when the same makes a turn. The resilient connections or springs 27 between the tubular sections 19 and the shaft 28 permit of the springing movement of the body and thus permit the automobile to travel over a rough road without damage to the dirigible headlights.

While I have shown and described the preferred embodiment of my invention, it is understood that such minor changes in arrangement and construction of parts may be made as will remain within the spirit of the invention and the scope of what is claimed.

Having thus described my invention, what I claim is:—

1. The combination with a motor vehicle having a fender, an axle and a spindle for the axle, of a lamp having a depending tubular extension passing through the fender, anti-friction elements carried by the fender and the adjacent portion of the depending tubular extension, an adjusting nut having threaded engagement with the tubular extension and engaging the under side of the fender, the lower portion of said depending tubular extension having a spring seat, a shaft carried by the spindle of the vehicle and having its upper portion provided with a spring seat, and a cushioning element arranged between said shaft and tubular extension and secured in the spring seats.

2. The combination with a motor vehicle having a fender, an axle and a spindle secured to the axle, of a lamp having a depending tubular extension extending through the fender, an operating shaft having its lower portion forked, pins extending from opposite sides of the knuckle of said spindle and engaging the forks of the shaft to secure the same, and a resilient member connecting said shaft with the lower portion of said depending tubular extension, and anti-friction elements rotatably supporting said depending tubular extension.

In testimony whereof I affix my signature in presence of two witnesses.

DAVID F. McCLURE.

Witnesses:
Isaac Cane Parks,
Violet M. Parks.